(12) United States Patent
Gemmell et al.

(10) Patent No.: US 8,126,879 B2
(45) Date of Patent: Feb. 28, 2012

(54) ASSISTED MANAGEMENT OF BOOKMARKED WEB PAGES

(75) Inventors: David James Gemmell, Sammamish, WA (US); Jonathan E. Fay, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 757 days.

(21) Appl. No.: 11/804,077

(22) Filed: May 17, 2007

(65) Prior Publication Data

US 2008/0288492 A1    Nov. 20, 2008

(51) Int. Cl.
*G06F 17/30* (2006.01)
(52) U.S. Cl. ........................... 707/723; 715/760
(58) Field of Classification Search .............. None
See application file for complete search history.

(56) References Cited

U.S. PATENT DOCUMENTS

| | | | |
|---|---|---|---|
| 7,013,423 B2 | 3/2006 | Blaschke et al. | |
| 7,076,546 B1 | 7/2006 | Bates et al. | |
| 7,167,901 B1 | 1/2007 | Beadle et al. | |
| 2002/0184095 A1 | 12/2002 | Scullard et al. | |
| 2004/0107208 A1 | 6/2004 | Seet et al. | |
| 2006/0026266 A1 | 2/2006 | Nishio et al. | |
| 2006/0064406 A1 | 3/2006 | Ehrich et al. | |
| 2006/0224608 A1 | 10/2006 | Zamir et al. | |
| 2006/0248059 A1 * | 11/2006 | Chi et al. | 707/3 |

OTHER PUBLICATIONS

Abrams, et al., "Information Archiving with Bookmarks: Personal Web Space Construction and Organization", Date: 1998, pp. 41-48, Perceptual Robotics, Inc., Oak Ave, Evanston, IL, Appears in Proceedings ACM SIGCHI.

Li, et al., "PowerBookmarks: A System for Personalizable Web Information Organization, Sharing, and Management", Date: Mar. 1, 1999, pp. 1-19, C&C Research Laboratories, NEC, USA.

Maarek, et al., "Automatically Organizing Bookmarks per Contents", Date: May 6-10, 1996, Fifth International World Wide Web Conference, Paris, France. http://iw3c2.cs.ust.hk/WWW5/www5conf.inria.fr/fich__html/papers/P37/Overview.html.

Anderson, C. et al.; "Web Montage: A Dynamic Personalized Start Page"; Proceedings of the Eleventh International World Wide Web Conference; Honolulu, Hawaii; May 2002.

Brank, J. et al.; "Predictive Algorithms for Browser Support of Habitual User Activities on the Web"; Proceedings of the 2005 IEEE/WIC/ACM International Conference on Web Intelligence (WI2005); Compiegne, France; Sep. 2005; pp. 629-635.

Gemmell, J. et al.; "Living With a Lifetime Store"; ATR Workshop on Ubiquitous Experience Media; Sep. 9-10, 2003; Keihanna Science City, Kyoto, Japan; pp. 69-76.

Li, W-S. et al.; "PowerBookmarks: A System for Personalizable Web Information Organization, Sharing, and Management"; Proceedings of the 1999 ACM SIGMOD International Conference on Management of Data (SIGMOD 99); Philadelphia, Pennsylvania; 1999, pp. 1375-1389.

(Continued)

*Primary Examiner* — Jean B Fleurantin
*Assistant Examiner* — Anteneh Girma

(57) ABSTRACT

In a method of assisting in management of a collection of bookmarked web pages, browsing information is received. The browsing information is related to a history of web browser use. A ranked list of web pages is generated from a plurality of web pages which is received in the browsing information. The generating is based upon a function including one or more statistical elements of the browsing information. Management information is provided based upon the ranked list of web pages. The management information is for assisting in management of a collection of bookmarked web pages.

18 Claims, 9 Drawing Sheets

OTHER PUBLICATIONS

Maarek, Y. et al.; "Automatically Organizing Bookmarks per Contents"; Proceedings of Computer Networks Systems; vol. 28; 1996; pp. 1321-1334.

Abrams, D. et al.; "Information archiving with bookmarks: personal Web space construction and organization"; Proceedings of the SIGCHI conference on Human factors in computing systems (CHI'98); 1998; Los Angeles, California; pp. 41-48.

Cockburn, A. et al.; "What Do Web Users Do? An Empirical Analysis of Web Use"; Int. J. Human-Computer Studies; vol. 54, No. 6; Jun. 2001; pp. 903-922.

Tauscher, L. et al.; "How people revisit web pages: empirical findings and implications for the design of history systems"; Int. J. Human-Computer Studies; vol. 47; 1997; pp. 97-137.

* cited by examiner

300

RECEIVING BROWSING INFORMATION RELATED TO A HISTORY OF WEB BROWSER USE.
310

GENERATING A RANKED LIST OF WEB PAGES FROM A PLURALITY OF WEB PAGES RECEIVED IN THE BROWSING INFORMATION.
320

PROVIDING MANAGEMENT INFORMATION BASED UPON THE RANKED LIST OF WEB PAGES.
330

```
RECEIVING BROWSING INFORMATION RELATED TO A HISTORY OF WEB
BROWSER USE.
310
```

↓

```
ASSIGNING RECOMMENDATION SCORES TO A PLURALITY OF WEB PAGES
KNOWN TO THE WEB BROWSER.
720
```

↓

```
SORTING THE PLURALITY OF WEB PAGES TO PRODUCE A RANKED LIST OF
WEB PAGES.
730
```

↓

```
PROVIDING A FIRST SUBSET OF THE RANKED LIST OF WEB PAGES FOR
ACCESS AS RECOMMENDED WEB PAGES FROM WITHIN A COLLECTION OF
BOOKMARKED WEB PAGES.
740
```

```
RECEIVING BROWSING INFORMATION RELATED TO A HISTORY OF WEB
BROWSER USE.
310
            │
            ▼
GENERATING A RANKED LIST OF WEB PAGES FROM A PLURALITY OF WEB
PAGES RECEIVED IN THE BROWSING INFORMATION.
320
            │
            ▼
IN RESPONSE TO A USER ACCESSING A COLLECTION OF BOOKMARKED WEB
PAGES, DISPLAYING UPON THE DISPLAY DEVICE A GROUPING OF
RECOMMENDED WEB PAGES COMPRISED OF A FIRST SUBSET OF THE
RANKED LIST OF WEB PAGES.
830
```

FIG. 8

ASSISTED MANAGEMENT OF BOOKMARKED WEB PAGES

BACKGROUND

Bookmarked web pages, sometimes called "favorites," are commonly stored and organized by a user in a collection, such as on a web page or in a folder hierarchy within a web browser. Typically, a user bookmarks a web page if he or she wants to visit the web page at some future time or if the web page was difficult to find. This is because having a web page referenced in this fashion can significantly reduce the time that it takes to navigate to the web page.

A user's collection of bookmarked web pages, and their own particular manner of organizing it, tends to take on a special familiarity or significance to a user over time. However, as the number of bookmarked web pages in a user's collection begins to grow large, a user often becomes frustrated with managing the collection. As a result of the user's frustration and the unwieldiness of managing a large collection of bookmarked web pages, a user's collection often ends up with a large number of duplicates and/or links to web pages that no longer exist.

Moreover, a collection of bookmarked web pages is only useful to a user if they add web pages to it. When a user's collection becomes large, it sometimes becomes cluttered. This leads to difficulty and frustration in a user finding a particular web page among the clutter and confusion of other bookmarked web pages which may be duplicates, may rarely (if ever) be accessed, or may be non-functional (e.g., links to web pages that no longer exist). In many instances, a large collection of bookmarked web pages can be frustrating enough to cause a user to quit adding web pages to it. The user may then become even more frustrated when they forget how to navigate to a particular web page or else spend considerable time or effort in navigating to a particular web page, which they could have, but didn't bookmark.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A technology for assisted management of bookmarked web pages is disclosed. In a method of assisting in management of a collection of bookmarked web pages, browsing information is received. The browsing information is related to a history of web browser use. A ranked list of web pages is generated from a plurality of web pages which is received in the browsing information. The generating is based upon a function including one or more statistical elements of the browsing information. Management information is provided based upon the ranked list of web pages. The management information is for assisting in management of a collection of bookmarked web pages.

Such management information may include one or more recommended web pages, which is/are recommended based upon an analysis of the received browsing information. Such management information may also include a visual indication or recommendation for the removal of one or more bookmarked web pages from the collection of bookmarked web pages. The visual indication(s) and/or recommendation(s) for removal are also based upon an analysis of the received browsing information. By providing this management information, a user is assisted in managing a collection of bookmarked web pages. Such recommendations improve the usefulness to a user of a collection of bookmarked web pages by continually providing relevant recommendations for updating the collection. Such recommendations also simplify user management of a collection of bookmarked web pages, as they can be enacted with minimal effort on the part of the user.

DESCRIPTION OF THE DRAWINGS

The accompanying drawings, which are incorporated in and form a part of this specification, illustrate embodiments of the technology for assisted management of bookmarked web pages and, together with the description, serve to explain principles discussed below:

FIG. 3 is an example flow diagram of operations performed in accordance with a method of assisting in management of a collection of bookmarked web pages, in accordance with one embodiment.

FIG. 7 is an example flow diagram of operations performed in accordance with a method of managing a collection of bookmarked web pages, in accordance with one embodiment.

FIG. 8 is an example flow diagram of operations performed in accordance with a method in a computer system for displaying on a display device, in accordance with one embodiment, information for assisting in user management of a collection of bookmarked web pages.

Figure 1:
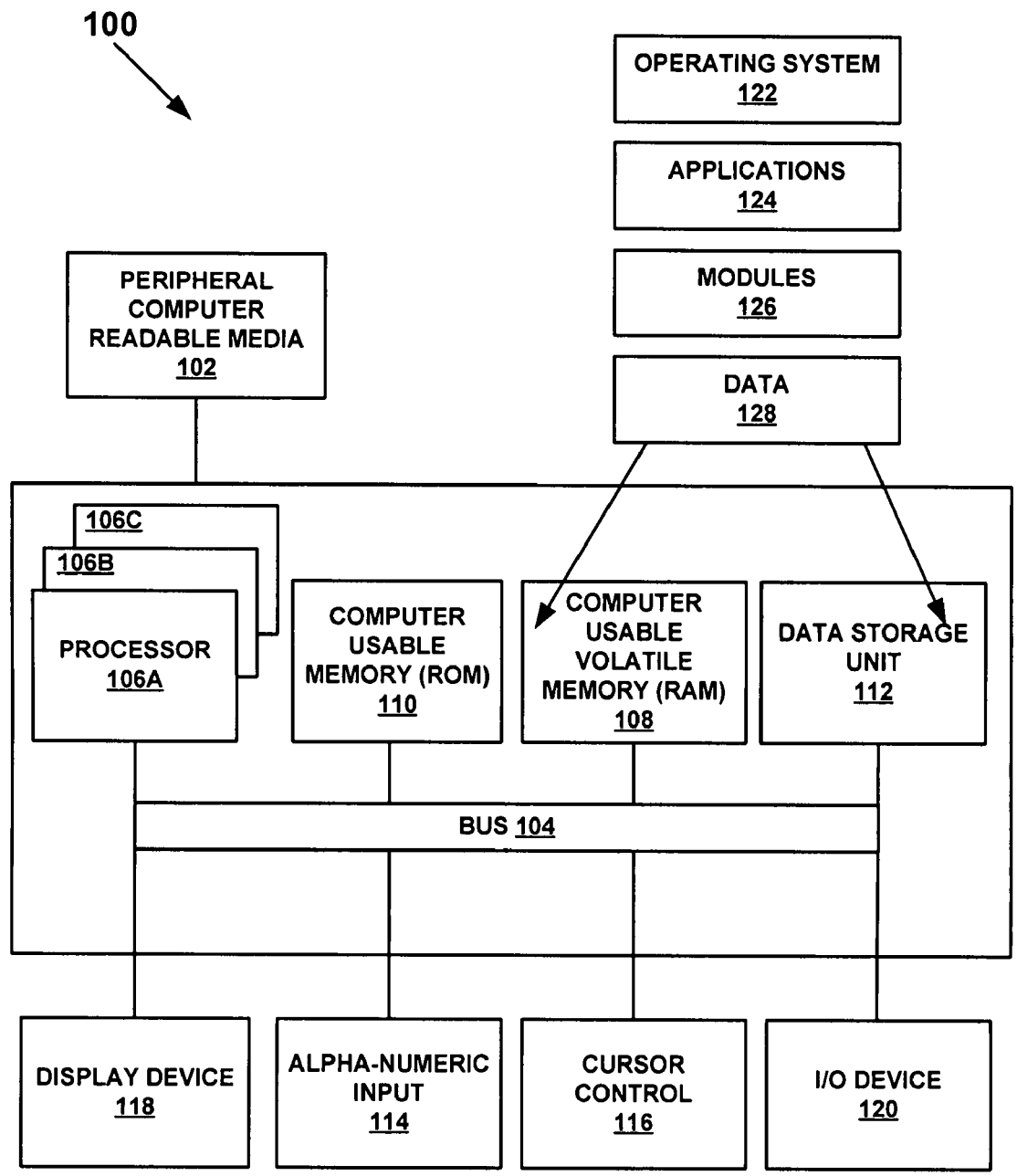
FIG. 1 is a diagram of an example computer system used in accordance with various embodiments described herein.

The drawings referred to in this description should be understood as not being drawn to scale unless specifically noted.

DETAILED DESCRIPTION

Reference will now be made in detail to embodiments of the present technology for assisted management of bookmarked web pages, examples of which are illustrated in the accompanying drawings. While the subject matter discussed herein will be described in conjunction with various embodiments, it will be understood that they are not intended to limit the present technology to these embodiments. On the contrary, the presented embodiments are intended to cover alternatives, modifications and equivalents, which may be included within the spirit and scope the various embodiments as defined by the appended claims. Furthermore, in the following detailed description, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present detailed description, discussions utilizing terms such as "receiving", "generating", "providing", "assigning", "indicating", "sorting", "recommending", "including", "culling", "adding", "displaying", or the like, refer to the actions and processes of a computer system (such as computer 100 of FIG. 1), or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Some embodiments of the present technology are also well suited to the use of other computer systems such as, for example, optical and virtual computers.

Overview of Discussion

The subject matter described herein assists a user in managing a collection of bookmarked web pages by analyzing browsing information and based upon this analysis providing management information. Such management information includes presenting web pages for access from, inclusion in, or removal from a collection of bookmarked web pages. For example, in one embodiment, when a user accesses a collection of bookmarked web pages, such as in his web browser or on a web site, one or more additional recommended web pages will also be presented. The recommended web pages are selected based upon an analysis of browsing information related to a history of web browser use. The user may select a recommended web page and be linked to the represented web page, or add a recommended web page to his collection of bookmarked web pages.

Similarly, in one embodiment, when a user accesses a collection of bookmarked web pages, such as in his web browser or on a web site, one or more web pages of the collection of bookmarked web pages may be visually identified for recommended removal from the collection of bookmarked web pages. Likewise, in one embodiment, one or more web pages of the user's collection of bookmarked web pages may appear upon a list of web pages which are recommended for removal from the collection of bookmarked web pages. Such recommendations for removal are based upon an analysis of browsing information related to a history of web browser use.

Discussion will begin with a description of an example computer system environment with which, or upon which, embodiments described herein may operate. Discussion will proceed to a description of an example bookmarked web pages assisted management system, which operates to provide management information for assisting a user in managing a collection of bookmarked web pages. Components of the bookmarked web pages assisted management system will be described. Operation of the bookmarked web pages assisted management system and its components will then be described in more detail in conjunction with a description of an example method of assisting in management of a collection of bookmarked web pages, in conjunction with an example method for performing a method of managing a collection of bookmarked web pages, and in conjunction with a method in a computer system for displaying on a display device information for assisting in user management of a collection of bookmarked web pages.

Example Computer System Environment

With reference now to FIG. 1, all or portions of some embodiments described herein are composed of computer-readable and computer-executable instructions that reside, for example, in computer-usable/computer-readable media of a computer system. That is, FIG. 1 illustrates one example of a type of computer (computer system 100) that can be used in accordance with or to implement various embodiments which are discussed herein. It is appreciated that computer system 100 of FIG. 1 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, media centers, handheld computer systems, multimedia devices, and the like. As shown in FIG. 1, computer system 100 of FIG. 1 is well adapted to having peripheral computer-readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands. System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In some embodiments, all or portions of technology for assisted management of bookmarked web pages is stored, for example, as an application 124 and/or module 126 in memory locations within RAM 108, computer-readable media within data storage unit 112, and/or peripheral computer-readable media 102.

Bookmarked Web Pages Assisted Management System

Figure 2:
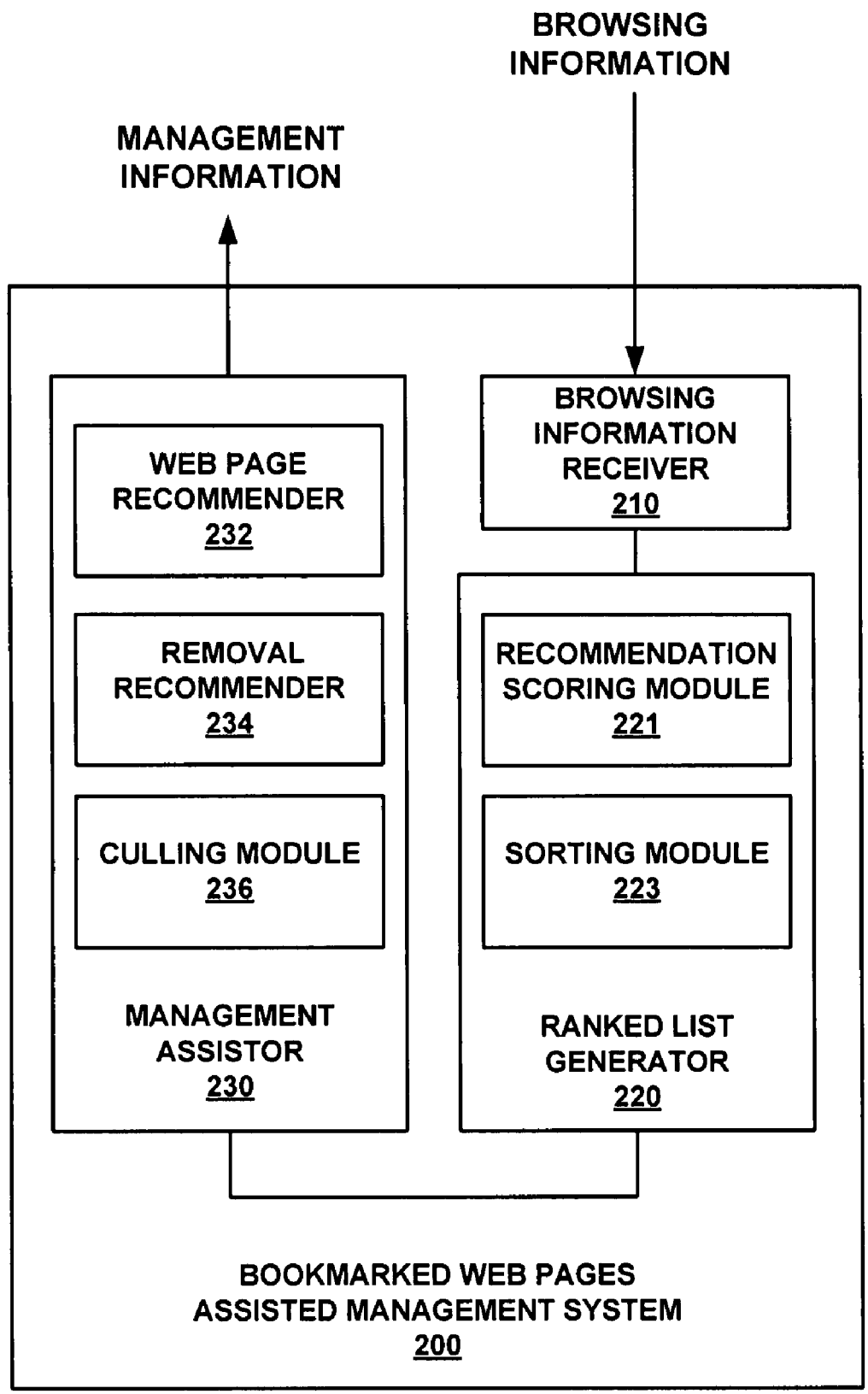
FIG. 2 shows a collection of bookmarked web pages assisted management system, according to one embodiment.

Referring now to FIG. 2, a bookmarked web pages assisted management system 200 is shown. System 200 receives browsing information, and from this browsing information generates management information for assisting in managing a collection of bookmarks. As shown in FIG. 2, system 200 is comprised a browsing information receiver 210, a ranked list generator 220, and a management assistor 230. For purposes clarity of description, functionality of each of the components and sub-components in FIG. 2 is shown separately and will described separately herein. However, it is appreciated that in some embodiments, functionalities ascribed herein to separate components and/or sub-components may be combined into fewer components and/or sub-components or distributed among a greater number of components and/or sub-components.

Browsing information receiver 210 receives browsing information related to a history of web browser use. Such browsing information is received, for example, from a web browser, operating system, or web site. Browsing information receiver 210 is coupled with ranked list generator 220 and provides all or portions of the received browsing information to ranked list generator 220 via the coupling.

Ranked list generator 220 generates a ranked list of web pages from a plurality of web pages received in the browsing information. For example, in one embodiment, ranked list generator 220 utilizes statistical browsing information to determine a "recommendation score" for one or more web pages in the plurality of web pages that are received as part of the browsing information. In one embodiment, recommendation scoring module 221 performs this recommendation scoring. For example, in one embodiment, recommendation scoring module 221, determines a recommendation score for each web page of the plurality of received web pages. As will be described further below, a recommendation score is a value which is used to represent a level of interest that a user has expressed in a web page, as determined by a function of one more elements of the received statistical information regarding the plurality of web pages. The value of a recommendation score also represents a likelihood that the user would benefit from having a particular web page included in a collection of bookmarked web pages. In one embodiment, ranked list generator 220 sorts the scored web pages are into a ranked list on the basis of their recommendation scores. In one embodiment, sorting module 223 performs this sorting. Ranked list generator 220 outputs the ranked list of web pages to management assistor 230 for evaluation.

Management assistor 230 is coupled with ranked list generator 220. Management assistor 230 provides an output in the form of management information for assisting in the management of a collection of bookmarked web pages. The management information is based upon a ranked list of web pages received from ranked list generator 220 and may include information such as a web page or pages recommended for inclusion in or with a collection of bookmarked web pages and/or a web page or pages recommended of removal from a collection of bookmarked web pages. In some embodiments, this management information is provided such that it may be displayed as a portion of user interface, for example, within a web browser or upon a web page displayed on a display device (e.g., display device 118 of FIG. 1).

For example, in one embodiment, web page recommender 232 selects a subset of web pages to recommend from the ranked list of web pages. This subset of recommended web pages is then provided as management information. Similarly, in one embodiment, removal recommender 234 selects a separate subset of pages to recommend for removal from a collection of bookmarked web pages. This subset of web pages recommended for removal is then provided as management information.

Additionally, in some embodiments, culling module 236, of management assistor 230, operates to cull one or more web pages from the ranked list of web pages, a subset of web pages that is being recommended, or a subset of web pages that is being recommended for removal. As will be further described below, culling module 236 performs culling based upon application of one or more rules related to a history of browser use information and/or statistical information regarding the web pages in the subsets, and or information related to the duplication of domain names.

Example Methods of Operation

The following discussion sets forth in detail the operation of some example methods of operation of embodiments of the present technology for assisted management of bookmarked web pages. With reference to FIG. 3, FIG. 7, and FIG. 8, flow diagrams 300, 700, and 800 each illustrate example steps used by various embodiments. Flow diagrams 300, 700, and 800 include processes that, in various embodiments, are carried out by a processor under the control of computer-readable and computer-executable instructions. The computer-readable and computer-executable instructions reside, for example, in data storage features such as computer usable volatile memory 108, computer usable non-volatile memory 110, peripheral computer-readable media 102, and/or data storage unit 112 of FIG. 1. The computer-readable and computer-executable instructions, which may reside on computer useable media, are used to control or operate in conjunction with, for example, processor 106A and/or processors 106A, 106B, and 106C of FIG. 1. Although specific steps are disclosed in flow diagrams 300, 700, and 800, such steps are examples. That is, embodiments are well suited to performing various other steps or variations of the steps recited in flow diagrams 300, 700, and 800. It is appreciated that the steps in flow diagrams 300, 700, and 800 may be performed in an order different than presented, and that not all of the steps in flow diagrams 300, 700, and 800 may be performed.

Assisting in Management of a Collection of Bookmarked Web Pages

FIG. 3 illustrates a flow diagram 300 of an example embodiment of a method of assisting in management of a collection of bookmarked web pages. Elements of flow diagram 300 are described below, with reference to elements of FIG. 2, FIG. 4, FIG. 5A, FIG. 5B, and FIG. 6.

At step 310 of flow diagram 300, in one embodiment, the method receives browsing information related to a history of web browser use. This comprises receiving browsing information from a web browser or other source. In one embodiment, this browsing information comprises an accounting, list, roster, or other communication which indicates a plurality of web pages known, for example, to a web browser (e.g., bookmarked web pages and/or web pages which have been accessed). In one embodiment, the browsing information is received by browsing information receiver 210, of system 200 (FIG. 2).

The received browsing information can comprise a history of user management of a collection of bookmarked web pages, which may be in the form of statistical information regarding user management events/actions. For example, the history of user management information includes information which can be interpreted to indicate a user's expression of an interest in a bookmarked web page, such as time/date information regarding when a name of a bookmarked web page was changed or altered by a user, time/date information regarding when a bookmarked web page was moved about relative to other bookmarked web pages by a user action, time/date information about when a bookmarked web page was added to a collection of bookmarked web pages, and time/date information about when a previously removed bookmarked web page was removed from a collection of bookmarked web pages.

The received browsing information can also comprise information regarding browsing of a plurality of web pages. In addition to receiving a plurality of web pages (e.g., bookmarked web pages and/or web pages which have been accessed by a browser), this also includes receiving statistical information regarding the browsing (or not browsing) of one or more web pages of this plurality of web pages. In one embodiment, for example, this includes receiving statistical information including: a time period since a web page was last accessed; how many times a web page has been accessed (e.g., a number of visits to a web page ever or within a defined time period); and/or a lifespan of use of a web page (e.g., a lifespan of use measured from a first use of a web page to a most recent use of the web page). In one embodiment, receiving browsing information comprises receiving a complete log of all browsing activities utilizing, such as all browsing activity for a particular user, computer, and/or browser.

The received browsing information may also comprise statistical information regarding one or more of the plurality of web pages, such as: a maximum time spent browsing a web page; a minimum time spent browsing a web page; an average time spent browsing a web page; a frequency of visits to a web page within an open browsing session; a number of links followed from a web page; a number of links followed before arriving at a web page; co-occurrence of a browsed web page as an already existing bookmark in a collection of bookmarked web pages; co-occurrence of browsed web page as an identical domain to a web page in a collection of bookmarked web pages; and/or co-occurrence of an identical domain to a web page with the received plurality of web pages. Additionally, browsing information from a complete log of activities may include information such as a log of user actions or statistics regarding user actions within in a given web page (e.g., scrolling a webpage or otherwise interacting with content of a web page during a visit).

Figure 4:
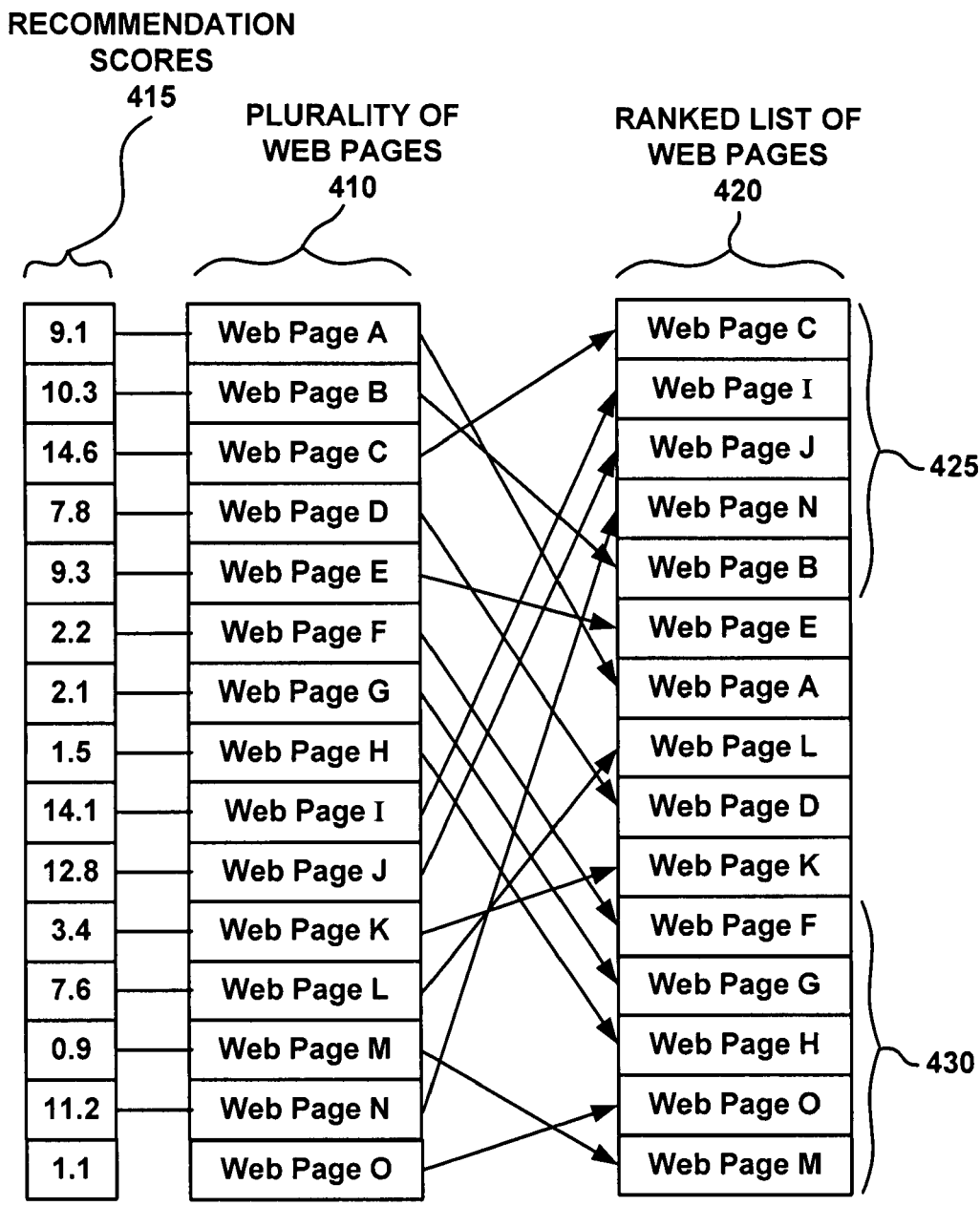
FIG. 4 shows an example of generation of a ranked listed of web pages, according to an embodiment.

FIG. 4 shows an example of a generation of a ranked listed of web pages, according to an embodiment. Of relevance to the preceding discussion, column 410 of FIG. 4 represents a plurality of web pages which is received, as a portion of the browsing information, for example by browsing information receiver 210.

At step 320 of flow diagram 300, in one embodiment, the method generates a ranked list of web pages from a plurality of web pages received in the browsing information. The generating of the ranked list of web pages is based upon a function which includes one or more statistical elements of the received browsing information. In one embodiment, ranked list generator 220 (FIG. 2) generates this ranked list of web pages.

As part of generating the ranked list of web pages, a recommendation score is generated for one or more of the plurality of web page received in the browsing information is generated. In one embodiment, recommendation scoring module 221 generates a recommendation score for one of these web pages as a function of one or more items of received statistical browsing information regarding the web page. For example, in one embodiment, a recommendation scoring function used by recommendation scoring module 221 takes into consideration the number of times a web page has been accessed, n; the time since last use of the web page, t; and the lifespan of use of the web page, T (e.g., the time span between the first use of the web page and the most recent use of the web page). An example of such a recommendation scoring function is shown in Table 1. As can be seen, the recommendation scores generated by the recommendation scoring function of Table 1 are defined in part by a relationship between a time since last access of a web page and a life span of use of the web page.

By appropriately setting the constants in the recommendation scoring function of Table 1, certain user expressed interests in a web page can be captured by a recommendation score. For example, in one embodiment, by appropriately setting the constants shown in Table 1, a recommendation score for a web page that has been opened numerous times over the course of a year and then not accessed for a week, will be significantly different from a recommendation score for a web page that has been that has only been opened a few times over the course of two days and then not accessed for a week. The difference between the recommendation scores captures the notion that a greater user interest has been measured in the web page which has been accessed numerous times over the course of a year. As can be seen, the recommendation score for a web page serves as a measure that is useable to compare levels of user interest measured in a plurality of such scored web pages.

TABLE 1

Example Recommendation Scoring Function $$f(n, t, T) = \left(\frac{t}{\alpha T}\right)^{\beta} + \frac{1}{\gamma n}$$

Where:
n = a number of times a web page has been accessed (ever or during a defined time period);
t = time since last access of the web page;
T = life span of accessing web page (e.g., time span between first and most recent accesses of a web page); $\alpha$, $\beta$, and $\gamma$ are constants, which may be selected to alter weights of variables upon a recommendation score determined by a recommendation function.

It should be appreciated that the function shown in Table 1 is only one example of a function for determining a recommendation score based upon received statistical information regarding the browsing of a web page. In other embodiments a greater or lesser number of the received statistical elements of browsing information may be included in a recommendation scoring function. As examples, consider the following alternative extensions of the recommendation scoring function shown Table 1.

In one embodiment, a variable is added to the recommendation scoring function of Table 1 to give weight to the amount of time (minimum, maximum, and/or average) spent accessing a web page. An appropriate constant may also be included with this variable to adjust the weighting of the variable. Adding such a variable captures, in the recommendation score, the distinction between web pages that are briefly scanned and web pages that are reviewed in detail.

In one embodiment, the variable related to number of visits to a web page, 1/yn, may be eliminated from the recommendation scoring function shown in Table 1. Eliminating this variable eliminates the favoring, in recommendation scores, of pages that are visited more frequently.

It is appreciated that, in a similar manner, weighting variables may be included in a recommendation scoring function to contribute weighting for other elements of received web page statistical information. For example, in various embodiments, one or more variables may be included in a recommendation function to give weight to statistical elements, such as: the frequency of access to a web page within an open browsing session; the number of links followed before arriving at a web page; and/or the number of links followed from a web page. Each of these variables may also include an assigned constant which is chosen appropriately scale the weight contributed by the variable. Such variables help measure factors such as the uniqueness of a web page and the likelihood of a user revisiting a web page, both of which may be used contribute to the measured user interest in a web page.

For example, by incorporating within a recommendation scoring function a weighting variable for a web page which is heavily linked from (essentially a web page used as a launching pad to get to other web pages), the recommendation score for such a heavily linked from web page reflects a greater amount of measured user interest than the recommendation score of an otherwise statistically identical page which fewer links were followed from. Similarly, incorporating a weighting variable for the number of links followed to access a web page, causes a page that is difficult to find (requires a lot of linking prior to access) to receive a recommendation score which reflects greater measured user interest than an otherwise identical page which can be reached in a fewer number of links. Additionally, incorporating a weighting variable for the number of times a web page is visited within an open browsing session causes a web page that is visited more frequently within an open browsing session to receive a recommendation score which reflects greater measure user interest than an otherwise similar web page which is visited less frequently.

With reference again to FIG. 4, column 415 shows notional recommendation scores which have been determined for each of the plurality of web pages of column 410.

In one embodiment, generating a ranked list of web pages from a plurality of web pages received in the browsing information comprises sorting some or all of the plurality of web pages into a ranked list according to where the web pages are rank ordered by their respective recommendation scores. For example, in one embodiment sorting module 223 sorts one or more of the received plurality of web pages into a ranked list in accordance to comparative levels of interest expressed by a user, as represented by the recommendation score for each rank listed web page.

With reference again to FIG. 4, an example of such sorting into a ranked list of web pages is illustrated. Column 420 of FIG. 4 represents a ranked list of web pages, which has been determined by sorting the web pages of column 410 according to the their respective recommendation scores (shown in column 415).

For purposes of example, and not of limitation, in FIG. 4 it may be assumed that a web page with a high recommendation score represents a web page which has been determined as having a high level of measured user interest (in accordance with a particular recommendation scoring function). Conversely, in FIG. 4, in may be assumed that a web page with a comparatively lower recommendation score represents a web page which has been determined as having a lower level of measured user interest (in accordance with the same recommendation scoring function). As such, in the ranked list of column 420, the web pages with a higher recommendation scores are sorted into positions in the list above web pages with comparatively lower recommendation scores.

At step 330 of flow diagram 300, in one embodiment, the method provides management information based upon the ranked list of web pages. This management information is for assisting in management of a collection of bookmarked web pages, such as bookmarked web pages in a "favorites" area of a web browser or bookmarked web pages stored on a web site. In one embodiment, the management information is determined by and then output by management assistor 230.

In some instances, providing management information comprises indicating a web page in a collection of bookmarked web pages which is recommended for removal from the collection of bookmarked web pages. For example, information about which web pages are in a collection of bookmarked web pages is received as browsing information, such as by browsing information receiver 210. This information about the collection of bookmarked web pages is then passed to management assistor 230, where it is used by removal recommender 234 to determine which, if any, of these bookmarked web pages are located below a certain threshold in a ranked list of web pages. This threshold may comprise a threshold recommendation score which is not achieved or exceeded, or a position in the ranked list of web pages which is not achieved or exceeded. For example, in one embodiment, removal recommender 234 applies a rule that bookmarked web pages ranked tenth or lower in the ranked list of web pages will be indicated for removal. Such indicating comprises, in one embodiment, simply outputting the recommendation from management assistor 230. In another embodiment, such indication comprises causing an entry for the web page in the collection of bookmarked web pages to be displayed in a distinctive fashion which indicates that it has been recommended for removal.

It should be appreciated that in some embodiments, the removal recommendation may be culled according to one or more rules to determine if any web pages should not be included in the removal recommendation. For example, in one instance, culling module 236 culls a web page from a list of web pages that would otherwise be recommended for removal. Thus, in one embodiment, culling module 236 will cull a web page from a list of web pages recommended for removal if the bookmark associated with that web page has been recently modified (e.g., renamed or moved within a collection of bookmarks) by a user, such as within D days, where D represents a pre-defined number of days such as 5 days. Such culling provides a certain amount of respect for a user's decision to interact with a bookmarked web page, by not immediately recommending the bookmarked web page for removal. Such culling may additionally be accomplished by adding a decay factor to a recommendation scoring function, such that a recommendation score is altered over a period of time following an event, such as user interaction (e.g., moving or renaming) a bookmark.

Figure 5A:
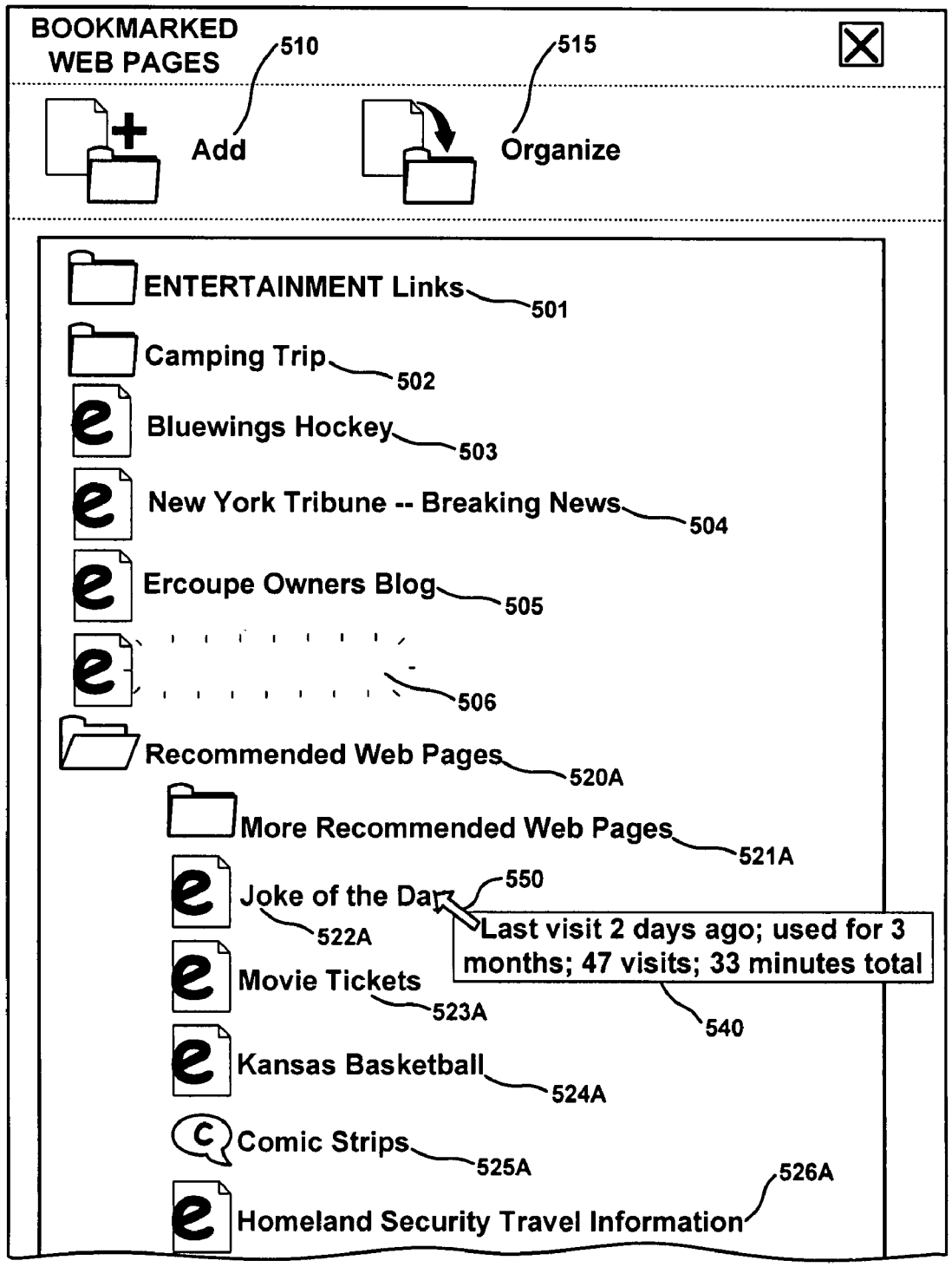
FIG. 5A shows a visual example of management information provided to assist in managing a collection of bookmarked web pages, according to an embodiment.

FIG. 5A shows a visual example of the display of management information provided to assist in managing a collection of bookmarked web pages, according to an embodiment. FIG. 5A shows a bookmarked collection of web pages presented within a web browser, such as in a drop down menu. FIG. 5A shows a plurality of bookmarked web pages 500A. For instance, folders 501 and 502 represent folders of bookmarked web pages, while bookmarked web pages 503, 504, 505, and 506 are represented as selectable regions (e.g., selectable with cursor 550). As can be seen, the selectable region for bookmarked web page 506 is represented in a different visual fashion from the selectable regions of bookmarked web pages 503, 504, and 505. In this example, the selectable region for bookmarked web page 506 is represented in italics and is shown flashing, in order to visually indicate that it has been recommended for removal. It is appreciated that other visually distinctions, such as, for example, highlighting, underlining, or displaying in a different color may also be used to indicate that a bookmarked web page has been recommended for removal.

Referring again to 330 of FIG. 3, in one embodiment, providing management information comprises providing a plurality of web pages recommended to include for access from within a collection of bookmarked web pages. For example, in one embodiment, web page recommender 232 recommends a particular subset of a ranked list of web pages, and this recommendation is output from management assistor 230. In one instance, this comprises web page recommender 232 selecting a subset of web pages from the ranked list that exceed a threshold recommendation score, and thus have been determined to exceed a predefined threshold of measured user interest based upon analysis of browsing information. In another instance, this comprises web page recommender 232 selecting a subset such as the top five ranked pages in a ranked list of web pages. In one embodiment, management assistor 230 outputs this subset of recommended web pages, for example to a web browser.

It should be appreciated that in some embodiments, prior to providing the plurality of recommended web pages, the plurality of pages may be culled according to one or more rules to determine if any web pages should not be included among the recommended web pages. For example, in one instance, culling module 236 culls a web page from a plurality of recommended web page if the web page is equivalent to a bookmarked page that was recently deleted by a user. Thus, in one embodiment, culling module 236 will remove a web page from a plurality of recommended if a user deleted a bookmark for the web page D days ago, where D represents a predefined number of days, such as 5 days. Such culling provides a certain amount of respect for a user's decision to remove a bookmarked web page, by not immediately re-recommending the same web page following the bookmarked web page's recent removal. Such culling may additionally be accomplished by adding a decay factor to a recommendation scoring function, such that a recommendation score is altered over a period of time following an event, such as user removal of a bookmark to the web page. Some other examples of culling include culling a web page from a recommendation if: it already exists as a bookmark, duplicates another recommended web page, has a common domain with a bookmark, and/or has a common domain as another of the plurality of recommended pages.

FIG. 5A shows an example of a plurality of selectable links for recommended web pages (522A, 523A, 524A, and 525A) being displayed in a folder of recommended web pages 520A, within a web browser's collection of bookmarked web pages 500A. Additional recommended web pages, such as the next five ranked web pages from a ranked list of web pages, may be included in a nested folder of more recommended web pages 521A.

Figure 5B:
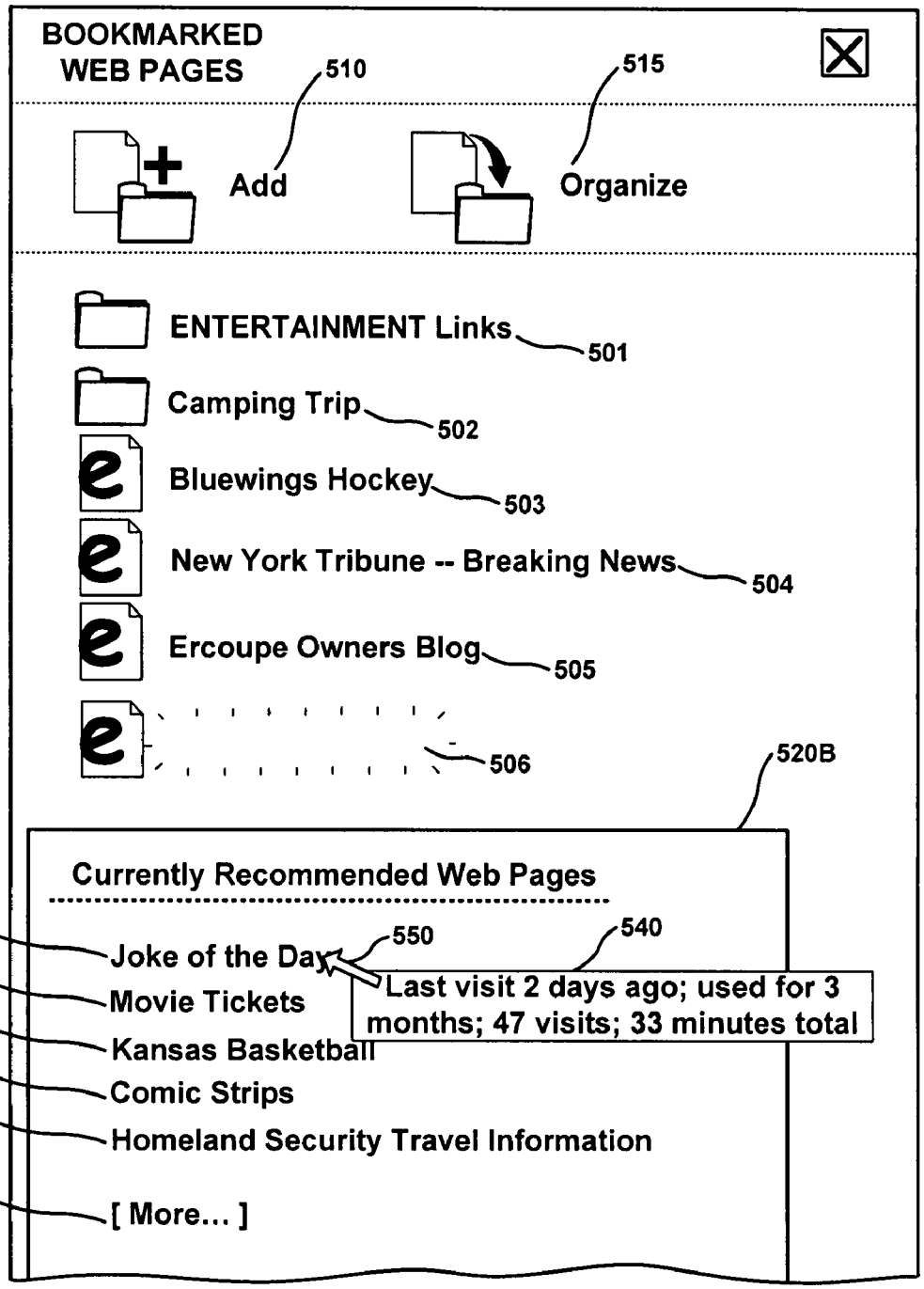
FIG. 5B shows a second visual example of management information provided to assist in managing a collection of bookmarked web pages, according to an embodiment.

FIG. 5B shows a second visual example of the display of management information provided to assist in managing a collection of bookmarked web pages, according to an embodiment. In FIG. 5B, like numbered elements are the same as like numbered elements of FIG. 5A. FIG. 5B represents the same information as FIG. 5A, except that the information regarding recommended web pages is displayed is different manner. For example, instead of being presented within a folder of recommended web pages, the recommended web pages 520B are presented as individual free floating links corresponding to each recommended web page (522B, 523B, 524B, 525B, and 526B). Additional recommended web pages, such as the next five ranked web pages from a ranked list of web pages, may be accessed via interaction, such as with cursor 550, with a selectable link associated with more recommended web pages 521A.

Referring again to 330 of FIG. 3, in one embodiment, providing management information comprises providing a list of web pages recommended for removal from a collection of favorites. If, for example, removal recommender 234 determines several booked marked web pages from a collection of bookmarked web pages fall below a designated threshold (either in recommendation score or in ranking within a ranked list of web pages), then those web pages are recommended for removal.

Consider an example where several web pages from a ranked list fall below such a ranking threshold. In one embodiment, this subset of several web pages from the ranked list of web pages is then recommended for removal from the collection of bookmarked web pages. In one embodiment, management assistor 230 outputs, for example to a web browser, this subset of web pages recommended for removal. Each of these web pages may be visually indicated for removal in the manner previously described and/or included in a selectable listing which facilitates streamlined removal of one or all of the web pages by a user. In one embodiment, culling is performed such that such a subset of web pages recommended for removal is culled in a manner previously described to determine if any web pages should not be included the subset of web pages being recommended for removal.

Figure 6:
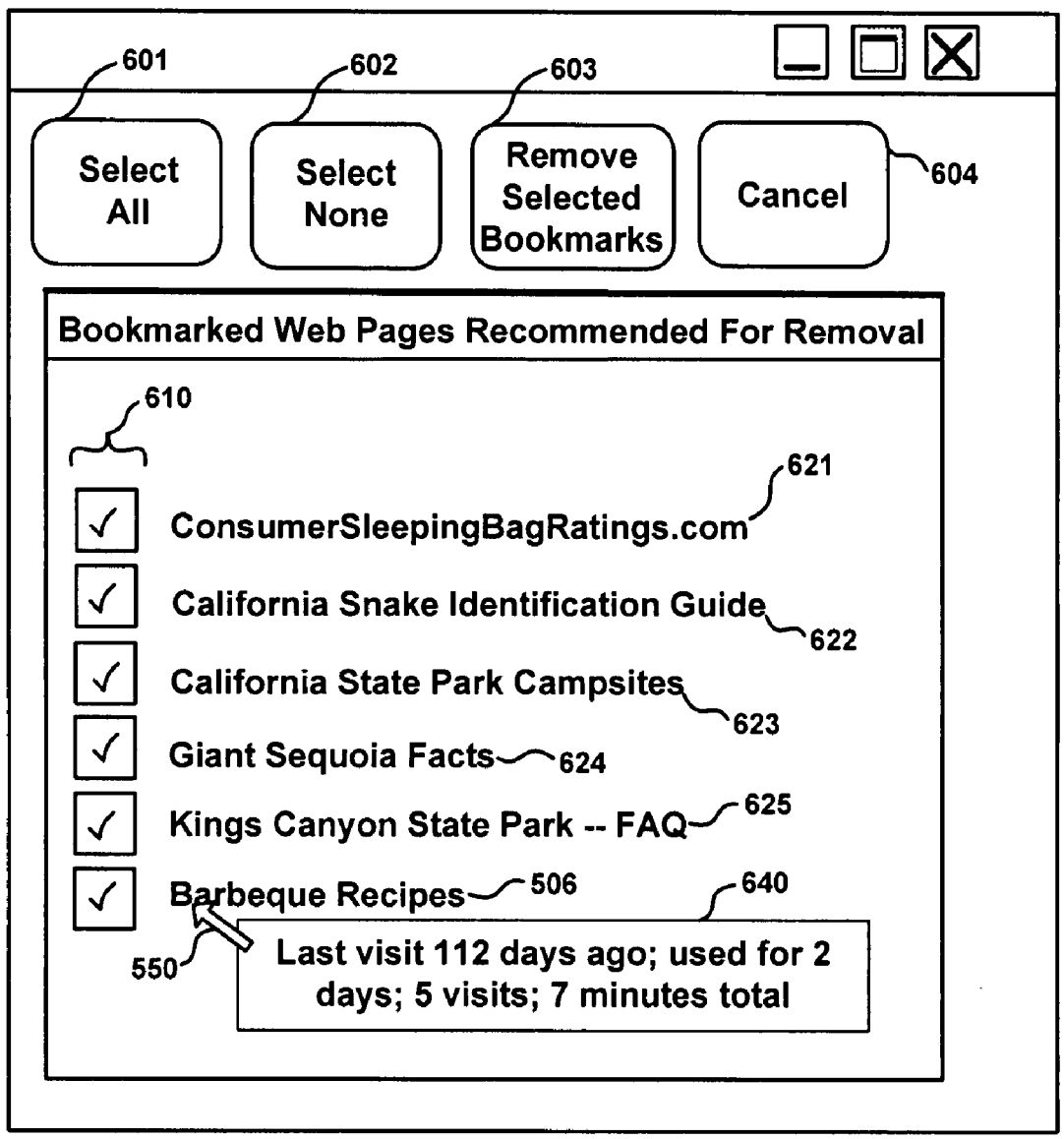
FIG. 6 shows a third visual example of management information provided to assist in managing a collection of bookmarked web pages, according to an embodiment.

FIG. 6, shows an example of such a selectable listing 600 of bookmarked web pages recommended for removal. A plurality selectable links associated with web pages (506, 621, 622, 623, 624, 625, and 626) are shown next to a corresponding plurality of selectable check boxes 610. It is appreciated that, the selectable check boxes may be checked or unchecked by a user, such as with cursor 550. Additionally, a user may "select all" of boxes 610 by engaging selectable region 601 with cursor 550; "select none" of selectable boxes 610 by engaging selectable region 602 with cursor 550; "remove selected bookmarks" by engaging selectable region 603 with cursor 550; or "cancel" a removal action by engaging selectable region 604 with cursor 550.

In one embodiment, a user causes historical use information regarding use of a web page to be displayed in response to positioning or briefly hovering (such as for a second) a cursor over the selectable link associated with the web page. In FIG. 6, for example, in response to cursor 550 being hovered over the selectable link associated with web page 506, dialog box 640 appears upon a display. As can be seen, dialog box 640 indicates historical use information, such as the time since a last visit or access of a web page, the number of visits or accesses of a web page, the total amount of time spent accessing a web page, and the lifespan of use of the web page (number of days between its first use and most recent use). It is appreciated that a greater or lesser amount of such historical use information may be displayed and that other types of historical use information may be displayed.

In another embodiment, historical use information regarding use of a web page being recommended for removal is automatically displayed in conjunction with display of one or more web pages being recommended for removal. For instance, in such an embodiment, some or all of the types of historical use information of dialog box 640 are displayed automatically in conjunction with presentation of one or more bookmarked web pages being recommended for removal from a collection of bookmarked web pages. As an example, such a display of historical use information may be in a row/column type format with a column for a particular category of historical use information such as, "date of last visit." In this fashion, historical use information related to a particular web page is via a row of the column which is adjacent to the display of the name of the web page/selectable link associated with the web page.

Managing a Collection of Bookmarked Web Pages

FIG. 7 illustrates a flow diagram 700 of an example method for managing a collection of bookmarked web pages. Elements of flow diagram 700 are explained below, with reference to elements of FIG. 2, FIG. 4, FIG. 5A, FIG. 5B, and FIG. 6 and with reference to steps of flow diagram 300.

At step 310 of flow diagram 700, in one embodiment, the method receives browsing information related to a history of web browser use. This is accomplished in the same manner as step 310 of flow diagram 300. Thus, in one embodiment as previously described herein, the browsing information is received by browsing information receiver 210. As previously described herein, this may comprise receiving statistical information related to a plurality of web pages known to the web browser (such as bookmarked web pages and/or web pages that have been accessed by the web browser). Similarly, as previously described herein, this may comprise receiving statistical information related to modification of the collection of bookmarked web pages.

At step 720 of flow diagram 700, in one embodiment, the method assigns recommendation scores to a plurality of web pages known to the web browser. The recommendation scores that are assigned are generated from one or more elements of the received browsing information. In one embodiment, one or more recommendation scores are generated by recommendation scoring module 221 in the manner previously described. For instance, as previously described in conjunction with Table 1 and step 320 of flow diagram 300, a recommendation scoring function may be used to calculate or determine a recommendation score for one or more of the plurality of web pages.

At step 730 of flow diagram 700, in one embodiment, the method sorts the plurality of web pages to produce a ranked list of web pages, the ranked list of web pages being rank ordered based upon the recommendation scores. In one embodiment, sorting module 223 performs this sorting in the manner previously described. For example, column 420 of FIG. 4 shows one of a plurality of web pages (column 410) which has been sorted into a ranked list of web pages, according to recommendation scores (column 415) for each of the respective plurality of web pages (column 410). This sorting can be in ascending or descending order according to the recommendation scores. Such sorting of the plurality of web pages has been previously described in conjunction with operations of step 320 of flow diagram 300, and in the interests of brevity and clarity will not be repeated again herein.

At step 740 of flow diagram 700, in one embodiment, the method provides a first subset of the ranked list of web pages for access as recommended web pages from within a collection of bookmarked web pages. For example, such a first subset may comprise a certain number of the web pages, such as the top five in measured user interest according to recommendation scores. In one embodiment, web page recommender 232 provides this first subset.

With reference again to FIG. 4, subset 425 shows one example of such a first subset of recommended web pages. Providing such a first subset for access comprises management assistor 230 interacting with a web site or with a web browser, such that the subset is presented for user access. This can also comprise displaying the first subset as selectable links within in a folder of a collection of book marked web pages, as is shown in FIG. 5A by folder 520A and the selectable links associated with recommended web pages 522A, 532A, 524A, 525A, and 526A. This can comprise displaying the subset as selectable links in either in a web browser's collection of bookmarked web pages or on a web site, as is shown in FIG. 5B by the collection of recommended web pages 520B which are presented as individual free floating links corresponding to a plurality of recommended web pages (521B, 522B, 523B, 524B, and 526B).

In one embodiment, step 740 also involves culling the first subset for a duplicated domain name. For example, the first subset is culled such that only one web page of a particular domain name appears in the recommended web pages which are output to a web browser, web site, computer, or other entity. In one embodiment, culling module 236 performs this culling. Such culling allows a broader cross-section of web pages to be recommended. For example, if two or more web pages with a similar domain were in the subset, the subset can be culled until only one of these web pages remained. In one instance, the remaining web pages of the subset are then output. In another instance, web page recommender 232 adds a non-domain duplicating web page to the subset to replace a culled web page.

In one embodiment, step 740 also involves culling the first subset for a domain name which appears in the collection of bookmarked web pages. For example, culling module 236 performs this culling based upon the received browsing information, and in particular based upon the domains of the bookmarked web pages which are received in the browsing information. Such culling prevents duplicating or providing similar recommendations to a web page which already exists as a bookmark, and thus allows a broader cross-section of web pages to be recommended. As with the previous culling, in one embodiment, web page recommender 232 adds a non-domain duplicating web page to the first subset to replace a culled web page.

In one embodiment, the method of flow diagram 700 further comprises adding a web page of the recommended web pages into a collection of bookmarked web pages, in response to a user action. For instance, with reference to FIG. 5A, web page 522A, "Joke of the Day," is added to a user's collection of bookmarked web pages via the user interacting with an existing "add" functionality 510 of the web browser. In another embodiment the adding is performed in response to a user dragging and dropping a selectable link associated with web page 522A out of folder 520A (recommended web pages) and into the user's bookmarked web pages. It is appreciated that such adding may similarly be performed with recommended web pages 520B shown in FIG. 5B.

In one embodiment, the method of flow diagram 700 also provides a second subset of the ranked list of web pages as a set of web pages recommended for removal from the collection of bookmarked web pages. For example, such a second subset may comprise a certain number of the web pages, such as any bookmarked web pages which fall below a certain ranking or recommendation score. In one embodiment, removal recommender 234 provides this second subset.

With reference again to FIG. 4, subset 430 shows one example of such a second subset of recommended web pages. Although shown as an ordered group, it is appreciated that this may not be the case in many instances. Providing such a second subset for recommended removal comprises management assistor 230 interacting with a web site or with a web browser, such that the subset is presented for user access or is available for user access. For example, with reference to FIGS. 5A and 5B, such a second subset of web pages recommended for removal may be presented to a user in response to a user accessing "organize" functionality 515. Presentation of this second subset is illustrated in FIG. 6.

With reference to FIG. 6, in one embodiment, the above described second subset of web pages recommended for removal from a collection of bookmarked web pages may be displayed as selectable listing 600 of web pages recommended for removal. A plurality of selectable links associated with web pages 506, 621, 622, 623, 624, 625, and 626 are shown next to a corresponding plurality of selectable check boxes 610. In one embodiment, web pages 621, 622, 623, 624, 625 represent the contents of folder 502 "camping trip", which is shown in FIGS. 5A and 5B. It is appreciated that the selectable check boxes 610 may be checked or unchecked by a user, such as with cursor 550. Additionally a user may "select all" of boxes 610 by engaging selectable region 601 with cursor 550; "select none" of selectable boxes 610 by engaging selectable region 602 with cursor 550; "remove selected bookmarks" by engaging selectable region 603 with cursor 550; or "cancel" a removal action by engaging selectable region 604 with cursor 550.

In some embodiments, the second subset may be culled prior to being provided as an output. For example, in one instance, the second subset is culled in accordance with statistical information related to modification of the collection of bookmarked web pages, such that a recently modified web page of the collection of bookmarked web pages is culled from the set of web pages recommended for removal. In one embodiment, this culling is performed by culling module 236.

Such culling may be based upon a user having recently (for example within one week) interacted with a particular web page of the subset. Such interaction may comprise renaming the web page, moving the web page, or having just added the web page. Such culling may also be implemented in a passive fashion by adding a decaying variable to the recommendation score of a recently interacted with bookmarked web page, such that the recommendation score measures a higher user interest following this user interaction. Such a decaying variable's influence would typically decay away and be removed after a pre-specified time period, such as a week.

In one embodiment, the method of flow diagram 700 further comprises removing, from a collection of bookmarked web pages, a web page of the set of web pages recommended for removal. This removal is accomplished in response to a user action. For example, with reference to FIG. 6, such a user action may comprise a user selection a selectable box 610 associated with web page 624, "Giant Sequoia Facts", and then using cursor 550 to engage selectable region 603, "remove selected bookmarks", to remove this bookmarked web page.

Displaying on a Display Device Information for Assisting in User Management of a Collection of Bookmarked Web Pages FIG. 8 illustrates a flow diagram 800 of an example method for displaying on a display device, information for assisting in user management of a collection of bookmarked web pages. Elements of flow diagram 800 are explained below, with reference to elements of FIG. 2, FIG. 4, FIG. 5A, FIG. 5B, FIG. 6 and portions of flow diagram 300 of FIG. 3.

At step 310 of flow diagram 800, in one embodiment, the method receives browsing information related to a history of web browser use. It is appreciated that this step is that same as previously described in conjunction within step 310 of flow diagram 300. In the interests of brevity and clarity, description of this step will not be repeated again herein.

At step 320 of flow diagram 800, in one embodiment, the method generates a ranked list of web pages from a plurality of web pages received in the browsing information. The generating is based upon a function including one or more statistical elements of the browsing information. In one embodiment, ranked list generator 220 generates this ranked list of web pages. It is appreciated that this step is that same as previously described in conjunction within step 320 of flow diagram 300. In the interests of brevity and clarity, description of this step will not be repeated again herein.

At step 830 of flow diagram 800, in one embodiment, the method displays upon a display device (e.g., display device 118) a grouping of recommended web pages comprised of a first subset of the ranked list of web pages. As previously described, in one embodiment, this first subset of web pages is selected by web page recommender 232, based upon rankings of the web pages within the ranked list of web pages. The displaying occurs in response to a user accessing a collection of bookmarked web pages, for example within a web browser or on a web site. Such accessing may comprise opening a web browser and/or opening a collection of bookmarked web pages (e.g., favorite web pages) in a web browser. Such accessing may also comprise opening a web site where a collection of bookmarked web pages is stored. FIG. 5A shows one example of a displayed grouping (folder 520A) of recommended web pages (522A, 523A, 524A, 525A, and 526A). FIG. 5B shows another example of a displayed grouping (520B) of recommended web pages (522B, 523B, 524B, 525B, and 526B).

In one embodiment, the method of flow diagram 800 further comprises displaying historical use information related to a recommended web page. This displaying occurs in response to a cursor being positioned above a selectable link associated with a recommended web page of a grouping of recommended web pages.

For example, FIG. 5A shows cursor 550 positioned above the selectable link associated with recommended web page 550A, "Joke of the Day." In response to this positioning of cursor 550, a dialog box 540 is displayed, which shows historical use information related to the use of recommended web page 522A. As can be seen, dialog box 540 indicates historical use information, such as the time since a last visit or access of a web page, the number of visits or accesses of a web page, the total amount of time spent accessing a web page, and the lifespan of use of the web page (number of days between its first use and most recent use). Such historical use information assists a user in determining whether to add a particular recommend web page as a bookmarked web page. It is appreciated that a greater or lesser amount of such historical use information may be displayed and that other types of historical use information may be displayed. In one embodiment, dialog box 540 only appears on a display after cursor 550 is hovered, such as for one second, above the link associated with recommended web page 522A. In FIG. 5B, an identical dialog box 540 has been displayed in response to cursor 550 being positioned above the selectable line associated with web page 522B.

In one embodiment, the method of flow diagram 800 further comprises displaying the collection of bookmarked web pages such that a web page of the collection of bookmarked web pages is visually identified for recommended removal. This visual identifying occurs in response to accessing the collection of bookmarked web pages. The visually identified web page is visually identified for removal based upon its ranking within the ranked list of web pages. Thus, for example, the identification for removal may be made based upon a recommendation score being below a predefined threshold or the actual ranking being below a predefined threshold.

With reference to FIGS. 5A and 5B, the selectable regions for bookmarked web page 506 are represented in a different visual fashion from the selectable regions of bookmarked web pages 503, 504, and 505. In these examples, the selectable region for bookmarked web page 506 is represented in italics and is shown flashing, in order to visually indicate that it has been recommended for removal. It is appreciated that other visually distinctions, such as, for example, highlighting, underlining, or displaying in a different color may also be used to indicate that a bookmarked web page has been recommended for removal.

Additionally, in response to a cursor being positioned above a selectable link associated with this visually identified web page, historical use information related to use of the web page is displayed. Such functionality, in the form of a dialog box has been previously described. Dialog boxes 540 (FIGS. 5A and 5B) and 640 (FIG. 6) show examples of such displayed historical use information. Providing this historical use information allows a user quickly ascertan information about why a web page may have been recommended from removal from a collection of bookmarked web pages. This assists a user in determining whether to remove the bookmarked web page.

In one embodiment, the method of flow diagram 800 further comprises displaying on the display device a selectable listing of web pages recommended for removal from the collection of bookmarked web pages. This selectable listing of comprises a second subset of the ranked list of web pages, and is displayed in response to a user selection of a management operation for cleaning up a collection of bookmarked web pages. As previously described, this second subset may be selected by removal recommender 234, and may comprise one or more bookmarked web pages with rankings and/or recommendation scores which fall below a pre-established threshold level, thus triggering a removal recommendation.

For example, a selectable listing 600 of web pages (621, 622, 623, 624, 625, and 506) recommended for removal from a collection of bookmarked web pages is shown FIG. 6. In one embodiment, selectable listing 600 is displayed in response to a user selection/initiation of a management operation, such as "organize" functionality 515 shown in FIGS. 5A and 5B.

In one embodiment, such a display of web pages recommended of removal may additionally include automatic display of historical use information related to one or more of the web pages in the selectable listing. In one embodiment, historical use information related to a web page is displayed, such as in dialog box 640 of FIG. 6, in response to a user action such as hovering a cursor over a web page name or selectable link in the selectable listing of web pages recommended for removal.

Example embodiments of the present technology for assisted management of bookmarked web pages are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   receiving browsing information related to a web browser use history associated with at least one web page of a collection of bookmarked web pages, wherein the received browsing information comprises statistical information, the statistical information comprising:
     a time since last access of the at least one web page,
     a number of visits to the at least one web page during a defined time period, and
     a lifespan of use measured from a first access of the at least one web page to a recent access of said at least one web page;
   generating a ranked list of the bookmarked web pages, said generating comprising utilizing a scoring function for assigning a recommendation score to the at least one web page based on the time since last access, the number of visits, the lifespan of use, and one or more constants for weighting at least one of: the time since last access, the number of visits, or the lifespan of use; and
   providing management information based upon said ranked list, said management information for assisting in management of the collection of bookmarked web pages and comprising a recommendation for removing the at least one web page from the collection of bookmarked web pages,
   wherein the management information includes the recommendation for removing the at least one web page from the collection of bookmarked web pages when at least one of:
     the at least one web page does not achieve or exceed a relative position in the ranked list of the bookmarked web pages, or
     the recommendation score assigned to the at least one web page does not achieve or exceed a threshold.

2. The method as recited in claim 1, wherein said receiving browsing information related to the web browser use history comprises:
   receiving a history of user management of said collection of bookmarked web pages.

3. The method as recited in claim 1, wherein said statistical information further comprises at least one of: a maximum time spent browsing said at least one web page; a minimum time spent browsing said at least one web page; an average time spent browsing said at least one web page; a frequency of visits to said at least one web page within an open browsing session; a number of links followed from said at least one web page; a number of links followed before arriving at said at least one web page; co-occurrence of said at least one web page as an already existing bookmark in said collection of bookmarked web pages; or co-occurrence of an identical domain to said at least one web page in said collection of bookmarked web pages.

4. The method as recited in claim 1, wherein said recommendation comprises: a list of individual bookmarked web pages recommended for removal from said collection of bookmarked web pages.

5. The method as recited in claim 1, wherein said recommendation comprises a plurality of individual web pages to include for access from within said collection of bookmarked web pages.

6. The method as recited in claim 1, wherein the scoring function comprises:

$$f(n, t, T) = \left(\frac{t}{\alpha T}\right)^{\beta} + \frac{1}{\gamma n}$$

where n represents the number of visits, t represents the time since last access, T represents the lifespan of use, and α, β, and γ represent individual constants of the one or more constants.

7. A computer-readable storage device comprising computer-executable instructions for performing a method comprising:
receiving browsing information related to a web browser use history associated with at least one web page of a collection of bookmarked web pages, wherein the received browsing information comprises statistical information, the statistical information comprising:
a time since last access of the at least one web page,
a number of visits to the at least one web page during a defined time period, and
a lifespan of use measured from a first access of the at least one web page to a recent access of said at least one web page;
generating a ranked list of the bookmarked web pages, said generating comprising utilizing a scoring function for assigning a recommendation score to the at least one web page based on the time since last access, the number of visits, the lifespan of use, and one or more constants for weighting at least one of: the time since last access, the number of visits, or the lifespan of use; and
providing management information based upon said ranked list, said management information for assisting in management of the collection of bookmarked web pages and comprising a recommendation for removing the at least one web page from the collection of bookmarked web pages,
wherein the management information includes the recommendation for removing the at least one web page from the collection of bookmarked web pages when at least one of:
the at least one web page does not achieve or exceed a relative position in the ranked list of the bookmarked web pages, or
the recommendation score assigned to the at least one web page does not achieve or exceed a threshold.

8. The computer-readable storage device as recited in claim 7, wherein said receiving browsing information related to the web browser use history comprises:
receiving a history of user management of said collection of bookmarked web pages.

9. The computer-readable storage device as recited in claim 7, wherein said statistical information further comprises at least one of: a maximum time spent browsing said at least one web page; a minimum time spent browsing said at least one web page; an average time spent browsing said at least one web page; a frequency of visits to said at least one web page within an open browsing session; a number of links followed from said at least one web page; a number of links followed before arriving at said at least one web page; co-occurrence of said at least one web page as an already existing bookmark in said collection of bookmarked web pages; or co-occurrence of an identical domain to said at least one web page in said collection of bookmarked web pages.

10. The computer-readable storage device as recited in claim 7, wherein said recommendation comprises: a list of individual bookmarked web pages recommended for removal from said collection of bookmarked web pages.

11. The computer-readable storage device as recited in claim 7, wherein said recommendation comprises a plurality of individual web pages to include for access from within said collection of bookmarked web pages.

12. The computer-readable storage device as recited in claim 7, wherein the scoring function comprises:

$$f(n, t, T) = \left(\frac{t}{\alpha T}\right)^{\beta} + \frac{1}{\gamma n}$$

where n represents the number of visits, t represents the time since last access, T represents the lifespan of use, and α, β, and γ represent individual constants of the one or more constants.

13. A system comprising:
a browsing information receiver configured to receive browsing information related to a web browser use history associated with at least one web page of a collection of bookmarked web pages, wherein the received browsing information comprises statistical information, the statistical information comprising:
a time since last access of the at least one web page,
a number of visits to the at least one web page during a defined time period, and
a lifespan of use measured from a first access of the at least one web page to a recent access of said at least one web page;
a ranked list generator configured to generate a ranked list of the bookmarked web pages utilizing a scoring function for assigning a recommendation score to the at least one web page based on the time since last access, the number of visits, the lifespan of use, and one or more constants for weighting at least one of: the time since last access, the number of visits, or the lifespan of use; and
a management assistor configured to provide management information based upon said ranked list, said management information for assisting in management of the collection of bookmarked web pages and comprising a recommendation for removing the at least one web page from the collection of bookmarked web pages,
wherein the management information includes the recommendation for removing the at least one web page from the collection of bookmarked web pages when at least one of:
the at least one web page does not achieve or exceed a relative position in the ranked list of the bookmarked web pages, or the recommendation score assigned to the at least one web page does not achieve or exceed a threshold; and at least one processor configured to execute one or more of the browsing information receiver, the ranked list generator, and the management assistor.

14. The system as recited in claim 13, wherein the browsing information comprises a history of user management of said collection of bookmarked web pages.

15. The system as recited in claim 13, wherein said statistical information further comprises at least one of: a maximum time spent browsing said at least one web page; a minimum time spent browsing said at least one web page; an average time spent browsing said at least one web page; a frequency of visits to said at least one web page within an open browsing session; a number of links followed from said at least one web page; a number of links followed before arriving at said at least one web page; co-occurrence of said at least one web page as an already existing bookmark in said collection of bookmarked web pages; or co-occurrence of an identical domain to said at least one web page in said collection of bookmarked web pages.

16. The system as recited in claim 13, wherein said recommendation comprises: a list of individual bookmarked web pages recommended for removal from said collection of bookmarked web pages.

17. The system as recited in claim 13, wherein said recommendation comprises a plurality of individual web pages to include for access from within said collection of bookmarked web pages.

18. The system as recited in claim 13, wherein the scoring function comprises:

$$f(n, t, T) = \left(\frac{t}{\alpha T}\right)^{\beta} + \frac{1}{\gamma n}$$

where n represents the number of visits, t represents the time since last access, T represents the lifespan of use, and $\alpha$, $\beta$, and $\gamma$ represent individual constants of the one or more constants.

\* \* \* \* \*